J. G. HEIDT.
ICE HOOK.
APPLICATION FILED JAN. 29, 1917.
1,250,169.
Patented Dec. 18, 1917.
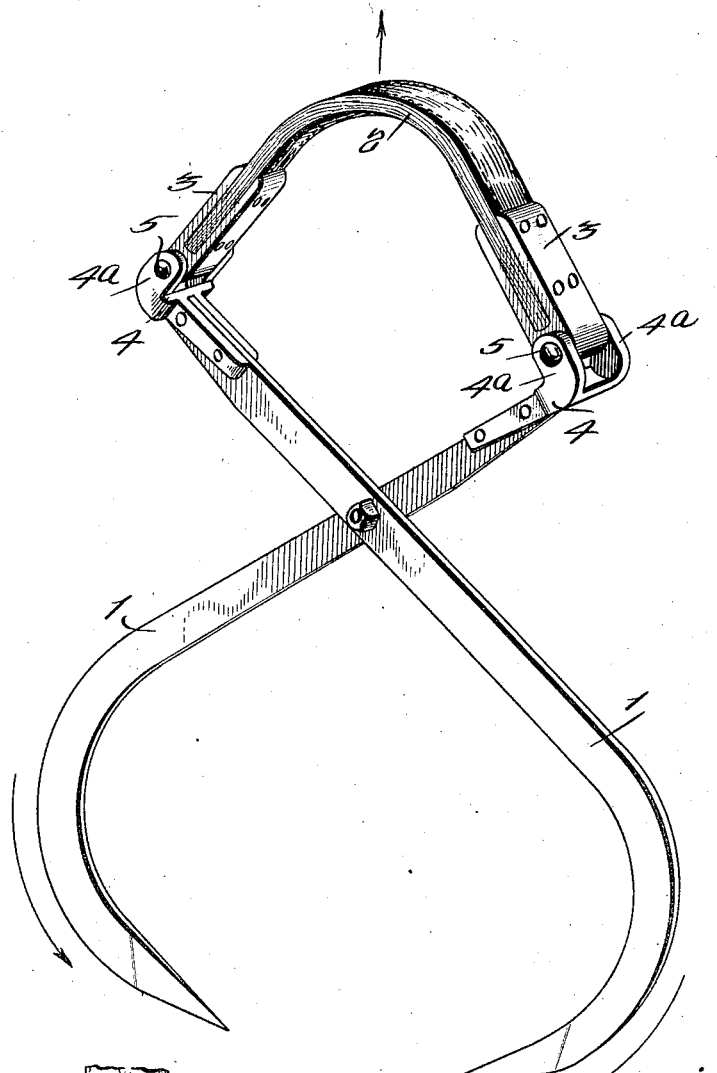
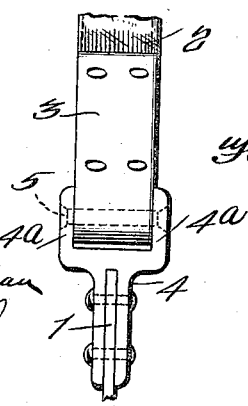
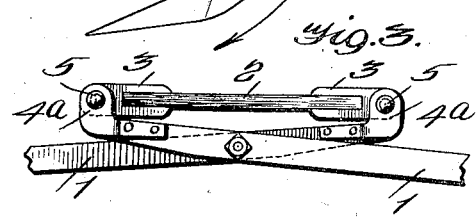
WITNESSES
E. M. Callaghan
W. E. Beck
INVENTOR
JACOB G. HEIDT,
BY
ATTORNEYS

UNITED STATES PATENT OFFICE.

JACOB GEORGE HEIDT, OF EVANSVILLE, INDIANA.

ICE-HOOK.

1,250,169.         Specification of Letters Patent.    Patented Dec. 18, 1917.

Application filed January 29, 1917. Serial No. 145,109.

*To all whom it may concern:*

Be it known that I, JACOB G. HEIDT, a citizen of the United States, and a resident of Evansville, in the county of Vanderburg and State of Indiana, have made an Improvement in Ice-Hooks, of which the following is a specification.

The object of the invention is to provide an improved ice-hook or ice-tongs having features of construction and operation which render them superior for their purpose.

The details are hereinafter described, and illustrated in the accompanying drawing, in which:

Figure 1 is a perspective view of the ice-hook with the hook proper partly open.

Fig. 2 is an end view of a portion of the hook.

Fig. 3 is a side view showing the hook in folded position.

The curved arms 1 are pivoted to each other in the usual way, and to their shanks are riveted slotted metal pieces 4, whose outer ends or ears 4ᵃ project inward at a right angle. The ends of the flexible rubber handle 2 are riveted to slotted metal pieces 3 which are in turn pivoted by a bolt 5 to and between the said ears 4ᵃ of the pieces 4.

It is apparent that a pull on the handle 2 in an upward direction, as indicated by arrows in Fig. 1, will cause the handle to assume a greater or less curve, and tends to bring the hooks together or cause them to grip a block of ice securely. The softness and flexibility of the handle 2 obviously render the hold of the ice man's hand thereon easy. The lateral projections of the ears 4ᵃ of the hinge piece 4 enable the pronged or socket pieces 3 and their connecting handle 2 to be brought into alinement or folded practically parallel to the hook shanks, as shown in Fig. 3, so that the hook as a whole occupies minimum space for storage and transportation.

The socket pieces 3 and eared pieces 4 are preferably made of malleable cast iron.

In case the leather handle or pivots become worn, they may be readily replaced by cutting away the heads of the rivets or removing the screws, if the latter be used in place of rivets.

I claim:

The improved ice hook comprising curved arms pivoted together and their shanks provided with right angular inwardly projecting ears, a flexible handle having metal connecting pieces pivoted to and between the said ears, whereby, when the ice hook is folded the handle will lie substantially parallel to the hook shanks, as shown and described.

JACOB GEORGE HEIDT.

Witnesses:
 GEO. L. HELDT,
 CARL DAY.

Copies of this patent may be obtained for five cents each, by addressing the "Commissioner of Patents, Washington, D. C."